Figure 1:
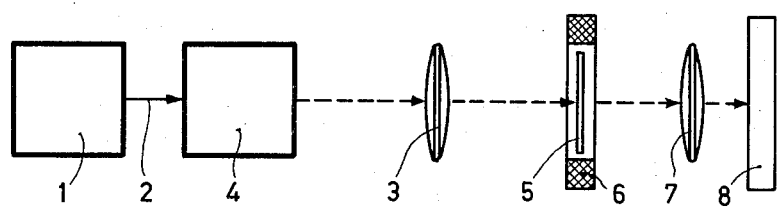

United States Patent [19]
Enz

[11] 3,838,907
[45] Oct. 1, 1974

[54] MAGNETISABLE MATERIAL FOR DETECTING OR RECORDING ELECTROMAGNETIC RADIATION

[75] Inventor: Ulrich Ernst Enz, Emmasingel, Eindhoven, Netherlands

[73] Assignee: U.S. Philips Corporation, New York, N.Y.

[22] Filed: Dec. 26, 1972

[21] Appl. No.: 318,567

Related U.S. Application Data

[60] Continuation-in-part of Ser. No. 156,566, June 24, 1971, which is a division of Ser. No. 855,571, Sept. 5, 1969, abandoned.

[52] U.S. Cl. .............. 350/151, 350/150, 350/160 R
[51] Int. Cl. ............................................ G02f 1/22
[58] Field of Search .................... 350/150, 151, 160

[56] References Cited
UNITED STATES PATENTS
3,447,851   6/1969   Remeika ............................. 350/151

OTHER PUBLICATIONS

Teale et al., "Photomagnetic Anneal" Physical Review Letters, Vol. 19, No. 16, Oct. 1967, pp. 904, 905.

Mee et al., "A Proposed Beam Addressable Memory" IEEE Trans on Magnetics, Vol. Mag. 3 – No. 1, March 1967, pp. 72–76.

Krinchik, "Mag Optical Prop of Garnet Ferrites in I. R. Region," Soviet Physics J.E.T.P., Vol. 13, No. 3, Sept. 61, pp. 509–511.

*Primary Examiner*—Ronald L. Wibert
*Assistant Examiner*—Michael J. Tokar
*Attorney, Agent, or Firm*—Frank R. Trifari; Carl P. Steinhauser

[57] ABSTRACT

A device for detecting electromagnetic radiation and for recording by means of electromagnetic radiation which employs an active element of a ferrimagnetic material having a garnet or spinel structure, which is kept in the dark and responds to irradiation with electromagnetic radiation, particularly infrared and X-ray radiation, by increasing at an essentially constant temperature below the Curie-point the coercivity or decreasing the permeability thereof.

5 Claims, 3 Drawing Figures

MAGNETISABLE MATERIAL FOR DETECTING OR RECORDING ELECTROMAGNETIC RADIATION

This application is a continuation-in-part of U.S. Pat. application Ser. No. 156,566, filed June 24, 1971 which is a division of U.S. Pat. application Ser. No. 855,571 filed Sept. 5, 1969, now abandoned.

This invention relates to a device for detecting electromagnetic radiation and for recording by means of electromagnetic radiation.

Such a device has been described by C. D. Mee in I.E.E.E. Transactions or Magnetics, March 1967, page 73 and further. This known device is adapted for the so-called method of thermo-magnetic writing.

A Mn-Bi layer which has been magnetised in one direction is locally heated by means of a radiation beam to above its Curie temperature. This heating is effected in a magnetic field the direction of which differs from that of the magnetisation in the layer. The magnetic moment in the layer locally decreases as the temperature increases so that from a certain temperature the field externally applied will cause the direction of magnetisation to rotate in the direction of this field. When the radiation is then removed and the temperature decreases again, the small region irradiated under the said conditions will exhibit a magnetisation which differs from that of the surroundings. In this way a magnetisation pattern can be provided which represents recorded intelligence.

Such a magnetisation pattern may be read, for example, by using the magneto-optic Faraday effect, whereby under the influence of a magnetic field, dependent upon the magnitude and the direction thereof, the plane of polarisation of a beam of linearly polarised electro-magnetic radiation is rotated.

Although the method of thermo-magnetic writing described above presents the advantage of a tenfold to hundredfold higher speed of recording and an approximately thirtyfold higher bit density, as compared to the method of recording in which intelligence is recorded by means of a magnetic head, it presents also a disadvantage: the maximum bit density that is obtainable is limited by the thermal conduction in the Mn-Bi layer. Owing to this conduction, a heated region will expand slightly to outside the irradiated spot, resulting in useful recording surface being lost. Further the maximum speed of recording that is obtainable is limited by the time required for the local heating of a spot.

It is an object of the invention to provide a device of the sort described above wherein use is not made of a thermomagnetic effect, but of a photomagnetic effect. The photomagnetic effect is found to be exhibited by a plurality of ferrimagnetic materials having a garnet or spinel structure. Since the power of a radiation beam needed to produce the photomagnetic effect is very low, irradiation practically does not result in heating of the material, so that the above-mentioned disadvantage caused by a thermal conduction will not occur. A higher bit density is the result. Furthermore the speed of registration is increased since the photomagnetic effect is a direct effect, whereas the thermo-magnetic writing technique necessitates a heating step and a combined cooling and magnetizing step.

Another object of the invention is to provide a device for making infra-red and X-ray patterns visible.

Another object of the invention is to provide a device for registrating X-ray deflection patterns on a medium which is easily erasable.

In the achievement of the above and other objects and as a feature of applicant's invention, there is provided a device for detecting electromagnetic radiation and recording by means of electromagnetic radiation comprising an active element of ferrimagnetic material having a garnet or spinel structure, the coercive force and permeability of which can be changed by electromagnetic radiation, said element being kept in the dark when not irradiated, a source of electromagnetic radiation for providing a radiation beam of a wavelength smaller than $1 \times 10^{-5}$ m, means for directing the radiation beam onto the active element, a first magnet to apply to the active element during or after exposure a magnetic field and read-out means including a source for providing a linearly polarized light beam of a wavelength and intensity which does not affect the magnetic properties of the active element, means allowing the polarized light beam to impinge on the active element, and a detector which is responsive to the rotation of the plane of polarisation in the transmitted or reflected beam.

Figure 2:
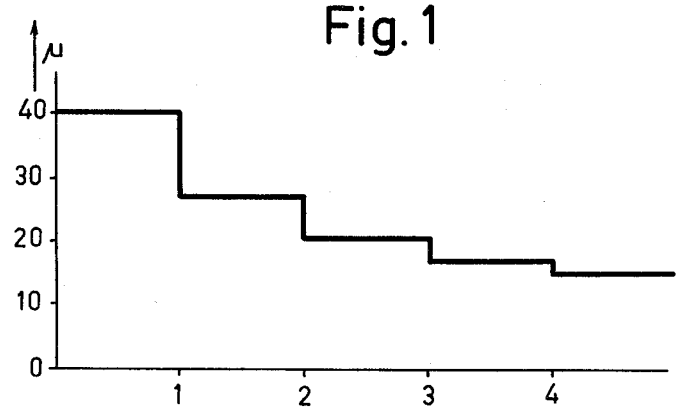
Figure 3:
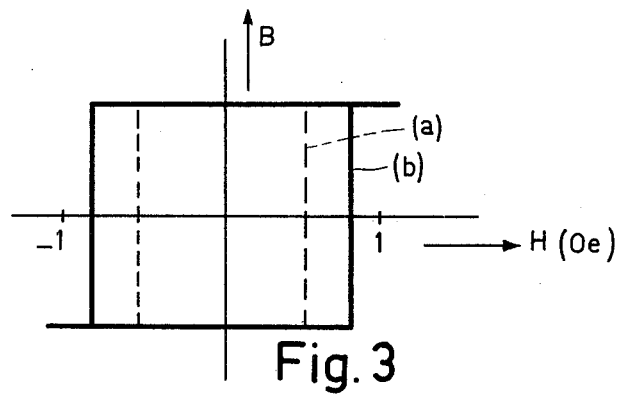

The invention will be further explained by way of example with reference to the accompanying drawings, in which FIG. 1 is a diagrammatic view of a device for detecting and/or recording electromagnetic radiation according to the invention;

FIGS. 2 and 3 are graphs used to illustrate the permeability and coercivity changes respectively.

In FIG. 1 an active magnetic element, i.e., an element a magnetic parameter of which can be changed by electromagnetic radiation as Si-doped Yttrium Iron Garnet, is shown at 5. The thickness of the element is such that the material is sufficiently transparant for the electromagnetic radiation which is produced by the light source 1. The wavelength of the radiation is less than 10 microns. The source 1 may be a laser. The beam 2 which is produced by the source 1 impinges on the active element 5 by way of deflecting means 4 (an electro-optical deflector) for deflecting the beam in a direction perpendicular to the plane of the drawing and by way of a lens 3. The element 4 enables the beam to be directed to any spot on the active element 5.

Surrounding the element 5 is an electromagnet 6 which can be energized to produce a magnetic field at right angles to the element 5.

After the element 5 has been given a degree of magnetization perpendicular to its plane, irradiation of discrete spots of the element will locally change the degree of magnetization. Thus there is formed an "image" in terms of the component of magnetization perpendicular to the plane of the element. It is noted that by moving the magnetic element sample, or many small samples, past the radiation beam a continuous recording somewhat similar to a magnetic tape would be obtained.

To achieve read-out, use may be made of the "Faraday" magneto-optical effect. The source 1 then provides a linearly polarized light beam of such a wavelength and intensity that the magnetic properties of the element 5 are not affected. When this light beam passes through the element 5, the polarization plane of the beam will undergo a rotation to a greater or a lesser extent, depending on the degree of magnetization of the particular portion of the element 5 which is addressed by the beam. After having passed through the element 5 and the lens 7 the light beam is detected by the detector 8. This detector is responsive to the rotation of the plane of polarization in the beam.

To illustrate the magnetic parameter change quantitatively an experiment was carried out on $Y_3Fe_{4.95}^{3+}(SiFe^{2+})_{0.025}O_{12}$. A body consisting thereof was cooled down to 77° K in the dark and demagnetised. A permeability $\mu$ of approximately 40 was measured. Then the body was irradiated with an electromagnetic radiation having a maximum wavelength of approximately 1.5 $\mu$ and an intensity at the surface of approximately $10^{-2}$ Watt/sq.cm. The magnetic permeability was found to decrease slowly until it was approximately 14 after 3 minutes.

The graph of FIG. 2 shows how the $\mu$ varies as a function of time if every minute an irradiation with a light-flash takes place with a flash-duration of $10^{-2}$ second.

An experiment likewise carried out on a $Y_3Fe_{4.95}^{3+}(SiFe^{2+})_{0.025}O_{12}$ body cooled down to 77° K in the dark, shows that irradiation with electromagnetic radiation ($\lambda_{max}$ = approximately 1.5 $\mu$) causes an increase in coercive force. See for this the graph of FIG. 3 which shows two hysteresis loops, the one (a) taken in the dark at 77° K, the other (b) after irradiation. The coercive force is found to have increased from approximately 0.5 to approximately 0.8 Oersted.

In practice the present invention is found to be important especially for recording signals on a magnetisable record carrier.

To be considered are, for example, devices as meant above for recording infrared and X-rays in which images of these rays can be converted into visible images. Use may also be made advantageously of the integrating effect of the radiation as a result of which variations in $H_c$ and $\mu$ are dependent upon the intensity of the radiation. By varying, during or right after the exposure with infrared or X-rays, the magnetic direction of the field with respect to that prior to the exposure, the image pattern is converted into a magnetisation pattern. The magnetic field strength must for that purpose have such a value that the magnetisation in the non-exposed parts rotates and in the exposed part does not rotate to the new direction of the field. By using polarised light and observing the reflected image through an analyser, the magnetisation pattern may be observed as a brightness pattern. Optionally an erasing step may be introduced during which the information recorded in the photomagnetic material is erased by heating.

When there is no erasing step introduced after the recording step and the reading step respectively, the photomagnetic material may be used as an image memory.

Another possible use of the device according to the invention is making visible an X-ray deflection pattern. Compared with the conventional recording devices, in which recording is made on a photographic plate, the device according to the invention has the great advantage inter alia that the photomagnetic recording medium can be erased in a simple manner. For example, now that the recording medium can be erased after each recording and consequently be used more than once, it may have the shape of a thin layer, applied to the inner surfache of a hollow hemisphere, in the centre of which the rotating crystal is in the primary X-ray beam.

In a photomagnetic device for recording electromagnetic signals with the aid of an active element as above referred to, to the element a magnetic field may be applied having a strength which lies between the coercive force of the unexposed material and that of the exposed material, and the direction of which differs from the direction of magnetisation of the unexposed material.

If, for instance in the form of a thin layer the material is exposed to electromagnetic radiation, for example a laser beam, the coercive force arising at the place where the radiation is focussed is higher than that in the surrounding region. A magnetic field subsequently applied with a strength such that the magnetisation in the unexposed regions can be directed, while the magnetisation in the exposed regions cannot be directed because of the locally higher coercive force will produce in the layer a pattern of magnetically non directed "islands" (the exposed parts) in a directed (the unexposed parts) "sea."

As has been mentioned already, such a magnetic pattern for example may be read-out with the use of the Faraday effect, either in reflection or in transmission.

The magnetic record pattern may be removed from the layer by heating same to a temperature at which the thermal energy of the electrons is high enough to restore the original situation.

What is claimed is:

1. A device for detecting electro-magnetic radiation and recording by means of electromagnetic radiation comprising an active element of ferrimagnetic material having a garnet or spinel structure having a given coercive force and a given permeability in the dark, a source of electromagnetic radiation for providing a radiation beam of a wavelength smaller than $1 \times 10^{-5}$ m, means for directing the radiation beam onto the active element to produce therein a change in coercive force or magnetic permeability, a first magnet to apply to the active element during or after exposure a magnetic field and read-out means including a source for providing a linearly polarized light beam of a wavelength and intensity which does not affect the magnetic properties of the active element, means allowing the polarized light beam to impinge on the active element, and a detector which is responsive to the rotation of the plane of polarisation in the transmitted or reflected beam.

2. A device according to claim 1, wherein infrared light is used for recording and wherein visible light is used for reading out.

3. A device according to claim 1, wherein X-rays are used for recording and wherein visible light is used for reading out.

4. A device according to claim 3, wherein the active element is present in the form of a thin layer, applied to the inner surface of a hollow hemisphere, in the centre of which a crystal may be rotatably positioned.

5. A device according to claim 1, including erasing means comprising a heat source for heating the active element.

* * * * *